(12) United States Patent
Choi

(10) Patent No.: US 8,666,452 B2
(45) Date of Patent: Mar. 4, 2014

(54) METHOD OF SETTING ENDING TIME OF APPLICATION OF MOBILE COMMUNICATION TERMINAL, METHOD OF ENDING APPLICATION OF MOBILE COMMUNICATION TERMINAL, AND MOBILE COMMUNICATION TERMINAL FOR PERFORMING THE SAME

(75) Inventor: Kilsoo Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1136 days.

(21) Appl. No.: 11/857,330

(22) Filed: Sep. 18, 2007

(65) Prior Publication Data

US 2008/0081600 A1 Apr. 3, 2008

(30) Foreign Application Priority Data

Oct. 2, 2006 (KR) ........................ 10-2006-0097247

(51) Int. Cl.
*H04M 1/00* (2006.01)

(52) U.S. Cl.
USPC ........ 455/566; 455/574; 455/418; 455/550.1; 455/556.1

(58) Field of Classification Search
USPC ................. 455/414.1, 550.1, 566, 418–420, 455/556.1–557, 414.4, 572–574; 718/100, 718/102, 103, 107
See application file for complete search history.

(56) References Cited

U.S. PATENT DOCUMENTS

| | | | | |
|---|---|---|---|---|
| 6,298,422 | B1 * | 10/2001 | Spilo et al. | 711/154 |
| 6,539,335 | B1 * | 3/2003 | Morris | 702/179 |
| 6,732,142 | B1 * | 5/2004 | Bates et al. | 709/203 |
| 6,978,152 | B1 * | 12/2005 | Yamaashi et al. | 455/526 |
| 7,103,387 | B2 * | 9/2006 | Seo | 455/566 |
| 7,860,492 | B2 * | 12/2010 | Bunte et al. | 455/418 |
| 8,417,233 | B2 * | 4/2013 | Woloshyn | 455/418 |
| 2002/0016163 | A1 * | 2/2002 | Burgan et al. | 455/412 |
| 2002/0173299 | A1 * | 11/2002 | Buchholz et al. | 455/418 |
| 2003/0100310 | A1 * | 5/2003 | Lindner et al. | 455/452 |
| 2008/0051070 | A1 * | 2/2008 | Dharmaji | 455/414.1 |
| 2009/0143114 | A1 * | 6/2009 | Vargas et al. | 455/574 |

FOREIGN PATENT DOCUMENTS

JP 10069366 * 3/1998 ................ G06F 1/14
KR 20050077266 8/2005

* cited by examiner

*Primary Examiner* — Sharad Rampuria
(74) *Attorney, Agent, or Firm* — Lee, Hong, Degerman, Kang & Waimey

(57) ABSTRACT

A method of setting an ending time of an application of a mobile communication terminal, a method of ending an application of a mobile communication terminal, and a mobile communication terminal for performing the same are provided. The method of ending an application of a mobile communication terminal includes performing a multitasking function in which a specific application enters a background state as another application is executed while the specific application is executed, displaying a menu screen for selecting whether to end the specific application when a predetermined end time of the specific application elapses from a time point at which the specific application entered the background state; and ending the specific application, if a user requests to end the specific application through the menu screen.

11 Claims, 4 Drawing Sheets

METHOD OF SETTING ENDING TIME OF APPLICATION OF MOBILE COMMUNICATION TERMINAL, METHOD OF ENDING APPLICATION OF MOBILE COMMUNICATION TERMINAL, AND MOBILE COMMUNICATION TERMINAL FOR PERFORMING THE SAME

CROSS REFERENCE TO RELATED APPLICATION

Pursuant to 35 U.S.C. §119(a), this application claims the benefit of earlier filing date and right of priority to Korean Application No. 10-2006-0097247 filed on Oct. 2, 2006, the entire contents of which are hereby incorporated by reference.

FIELD OF THE INVENTION

This document is directed to a method of setting an automatic ending time of an application of a mobile communication terminal, a method of ending an application of a mobile communication terminal, and a mobile communication terminal for performing the same.

DESCRIPTION OF THE RELATED ART

In a mobile communication terminal multitasking that can perform several tasks at the same time is supported as the processing speed increases and memory capacity increases. In supporting the multitasking, when various tasks are performed, the most recently executed application is executed in a foreground state and the previously executed applications wait for a task in a background state.

When several application tasks wait in a background state, battery consumption increases and a processing speed of the mobile communication terminal decreases. In order to end applications waiting for a task in a background state, a user should directly end the applications one by one.

Furthermore, when all currently executing tasks are ended, the application performing a task in a foreground state is also ended.

SUMMARY OF THE INVENTION

An object of the present invention is to provide a method for a mobile communication terminal to automatically end an application when the executed application is in a background state waiting for a task for a predetermined time.

In one aspect of the present invention, a method of setting an ending time for a plurality of applications of a mobile communication terminal, the method comprises setting an ending time for automatically ending each of the plurality of applications when a predetermined time elapses from a time point in which an executing application enters a background state; and storing the ending time set for each of the plurality of applications in a memory unit.

In another aspect of the present invention, a method of ending an application of a mobile communication terminal comprises performing a multitasking in which a specific application enters a background state as another application is executed while the specific application is executed; displaying a menu screen for selecting whether to end the specific application when a predetermined end time of the specific application elapses from a time point at which the specific application entered the background state; and ending the specific application, if a user requests to end the specific application through the menu screen.

It is contemplated that the method of the present invention further comprises checking whether the predetermined end time of the specific application elapses from the time point at which the specific application enters the background state. It is further contemplated that the predetermined ending time of the specific application can be changed by a user's setting.

It is contemplated that the method of the present invention further comprises extending execution of the specific application if a user requests to not end the specific application through the menu screen. It is further contemplated that the specific application is extended by the predetermined ending time.

In another aspect of the present invention, a mobile communication terminal comprises a mobile communication terminal, comprises an input unit for requesting execution of a first application and setting an ending time of the first application; a memory unit for storing the ending time of the first application; a controller for executing the first application, entering the first application to a background state when execution of a second application is requested from the input unit, and ending the first application when an ending time of the first application elapses from a time point at which the first application enters a background state; and a display unit configured to display a menu screen for setting the ending time for the first application.

It is contemplated that the mobile communication terminal further comprises a display unit for displaying a menu screen for selecting whether to end the first application in the background state when the ending time of the first application elapses from a time point at which the first application enters the background state. It is further contemplated that the controller extends execution of the first application when an input is received via the input unit from the menu screen, the input indicating that the first application is not to be ended.

It is contemplated that the controller extends execution of the first application by an automatic ending time of the specific application preset in the memory unit. It is further contemplated that the input unit is a keypad comprising at least one of a direction key, a jog dial and a touch screen.

In yet another aspect of the present invention, a method of managing execution times for a plurality of applications in a mobile communication terminal, the method comprises setting an ending time for automatically ending each application in the mobile communication terminal; storing the ending time set for each application; performing a multitasking in which a specific application being executed enters a background state as another application is executed; displaying a menu screen for selecting whether to end the specific application when the stored end time corresponding to the specific application elapses from a time point at which the specific application enters the background state; ending the specific application if a user requests to end the specific application through the menu screen; and extending execution of the specific application if the user requests to not end the specific application through the menu screen.

It is contemplated that the method further comprises checking whether the stored end time corresponding to the specific application elapses from the time point at which the specific application enters the background state. It is further contemplated that the execution of the specific application is extended by the stored time corresponding to the specific application.

The object of the present invention is not limited to the above-described objects and the other objects will be understood by those skilled in the art from the following description.

BRIEF DESCRIPTION OF THE DRAWINGS

The implementation of the present invention will be described in detail with reference to the following drawings in which like numerals refer to like elements.

DETAILED DESCRIPTION OF THE PREFERRED EMBODIMENTS

Hereinafter, an implementation of this invention will be described in detail with reference to the attached drawings.

Figure 1:
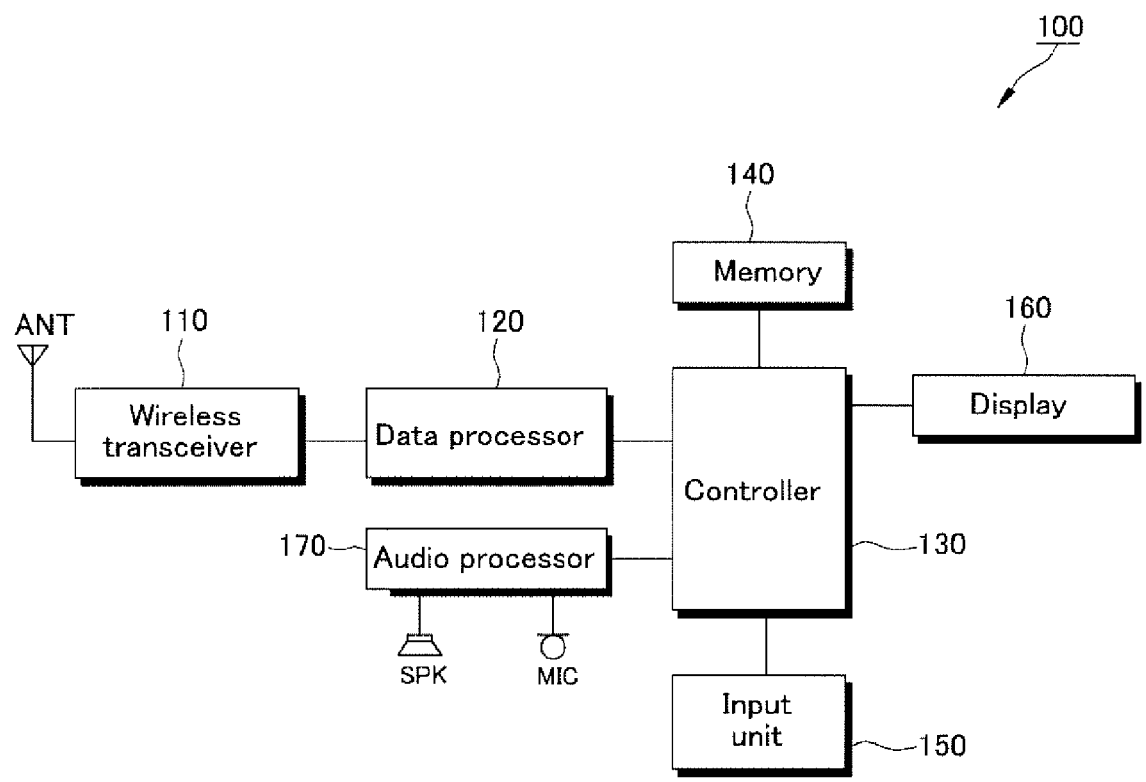
FIG. 1 is a block diagram illustrating a configuration of a mobile communication terminal according to the present invention.

FIG. 1 is a block diagram illustrating a configuration of a mobile communication terminal according to the present invention. As illustrated in FIG. 1, a mobile communication terminal 100 comprises a wireless transceiver 110, a data processor 120, a controller 130, a memory unit 140, an input unit 150, a display unit 160, and an audio processor 170.

The wireless transceiver 110 performs a communication function of the mobile communication terminal 100. The wireless transceiver 110 comprises a radio frequency (RF) transmitter for up-converting and amplifying a frequency of a signal to be transmitted and an RF receiver for low-noise amplifying a received signal and down-converting a frequency thereof.

The data processor 120 comprises a transmitter for encoding and modulating a signal to be transmitted and a receiver for demodulating and decoding a received signal.

The controller 130 performs the entire control function of the mobile communication terminal 100. In the implementation, the controller 130 controls and manages a multitasking under a real time operating system stored in the memory unit 140. The controller 130 controls to execute several tasks by a priority determined according to the urgency and importance of a processing function.

In one embodiment of the present invention, the controller 130 checks an elapsed time from an entry time point to a background state for each application and checks whether an elapsed time from a time point in which each application enters a background state reaches an ending time of the corresponding application stored in the memory unit 140.

If an elapsed time from a time point in which an application enters a background state reaches an ending time of the corresponding application stored in the memory unit 140, the controller 130 controls to display a menu screen for allowing the user to select to end the corresponding application in the display unit 160.

If the user requests to end the corresponding application, the controller 130 ends the corresponding application, and if the user requests a continuous execution of the corresponding application, the controller 130 controls to extend execution of the corresponding application for a predetermined time.

The memory unit 140 comprises a program memory and data memories. In the program memory, programs for controlling a general operation of the mobile communication terminal 100 and a real time operating system (OS) program for supporting a multitasking of the mobile communication terminal 100 are stored. In the operation of the present invention, the memory unit 140 stores an ending time for each application set by a user through the input unit 150.

The input unit 150 comprises various buttons for inputting numeric and character information and function buttons for setting various functions. The input unit 150 can be embodied with a keypad comprising a direction key, a jog dial, a touch screen and a joy stick. Those skilled in the art will appreciate that the input unit 150 is not limited to the referenced embodiments.

In the present invention, the input unit 150 receives an ending time of an application in a background state from the user and provides the ending time to the controller 130. Further, if an ending time of an application in a background state passes, the input unit 150 receives the users selection on whether to end the corresponding application and provides the selection to the controller 130.

The display unit 160 outputs various display information and various menu screens from the mobile communication terminal 100 and comprises a Liquid Crystal Display (LCD) or an Organic Light Emitting Diode (OLED). Further, the display unit 160 may comprise at least two display units (not shown) comprising an external display unit and an internal display unit.

In an example of the present invention, the display unit 160 displays a menu screen for setting an ending time of a specific application. Further, the display unit 160 displays a menu screen for allowing the user to select whether to end a specific application when an ending time of the specific application in a background state passes under control of the controller 130.

The audio processor 170 performs a function for reproducing an audio signal decoded and output in the data processor 120 through a speaker (SPK) and transmitting an audio signal generated from a microphone (MIC) to the data processor 120.

Although not shown in FIG. 1, the mobile communication terminal may further comprise a camera module unit for photographing a specific subject.

Figure 2:
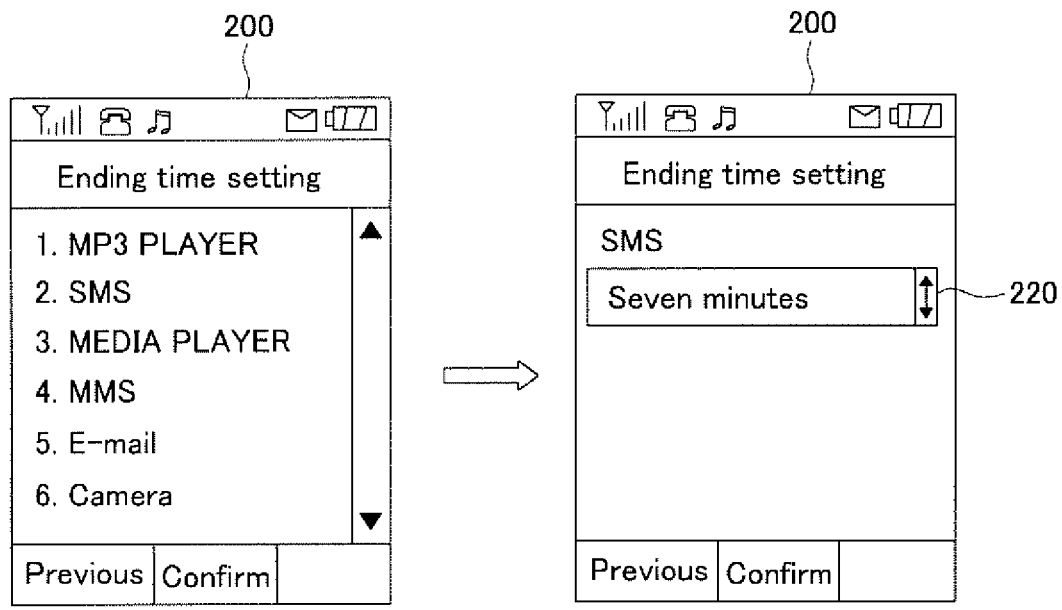
FIG. 2 illustrates a menu screen for setting an automatic ending time for an application according to the present invention.

FIG. 2 illustrates a menu screen for setting an automatic ending time of an application in an example of the present invention.

When a process enters an ending time setting menu for setting an automatic ending time for each application as the input unit 150 is manipulated by a user, a menu screen 200 for setting an ending time for each application shown in FIG. 2 is displayed.

An ending time can be set in all applications supported by a mobile communication terminal. As illustrated in FIG. 2, the user can set an ending time to applications such as an MP3 player, a Short Message Service (SMS), a media player, a Multimedia Message Service (MMS), an E-mail, and a camera photographing.

The applications shown in FIG. 2 are merely an illustration, and the user can set an ending time to applications such as an image viewer, a game, and a wireless Internet connection.

When the user selects any one of various applications, a menu screen comprising an ending time setting window 220 for setting an ending time of the corresponding application is displayed. As illustrated in FIG. 2, when the user selects a SMS among applications that can be supported in the mobile communication terminal 100 and presses a confirmation button, the ending time setting window 220 for setting an ending time to the SMS application is displayed.

In an embodiment of the present invention, an application is automatically ended when an ending time for the application is set and there is no user operation until the application reaches a set ending time from a time point in which the application enters a background state.

Figure 3:
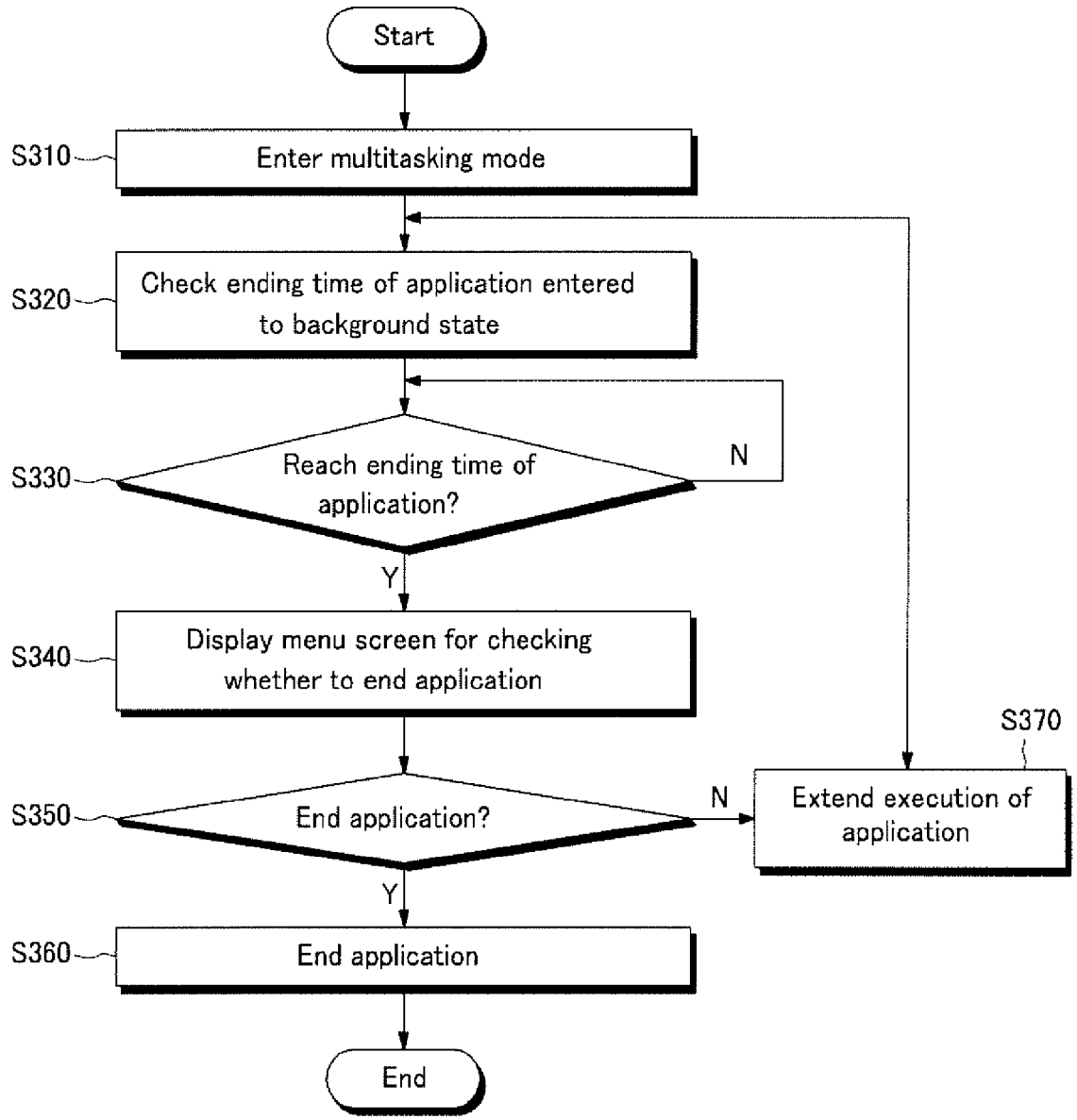
FIG. 3 is a flowchart illustrating a method of ending an application of a mobile communication terminal according to the present invention.

FIG. 3 is a flowchart illustrating an application ending method of a mobile communication terminal according to an embodiment of the invention. Referring to FIG. 3, if execution of a plurality of applications is requested by the user, the controller 130 enters a multitasking mode so that the requested application may be executed (S310).

In the multitasking mode, the most recently executed application is in a foreground state and the previously executed applications are in a background state. Here, the foreground state is a state in which an execution screen of the corresponding application is displayed in the display unit 160 of the mobile communication terminal 100, and the background state is a state in which the corresponding application waits for a task without being displaying in the display unit 160 of the mobile communication terminal 100.

At this time, an icon of an application can be displayed in a specific position of the display unit 160 to enable the user to know the application exists in a background state. Through the icon, the user can check an application currently waiting for a task in a background state.

If a specific application enters a background state, the controller 130 checks an ending time of the specific application stored in the memory unit 140 (S320). The controller 130 can check whether an elapsed time from a time point in which the application enters the background state reaches the application ending time stored in the memory unit 140. If an elapsed time from a time point in which the application enters the background state reaches an ending time of the application stored in the memory unit 140 (S330: Y), the controller 130 controls to display in the display unit 160 a menu screen for allowing the user to select to end an application in the background state (S340).

Figure 4:
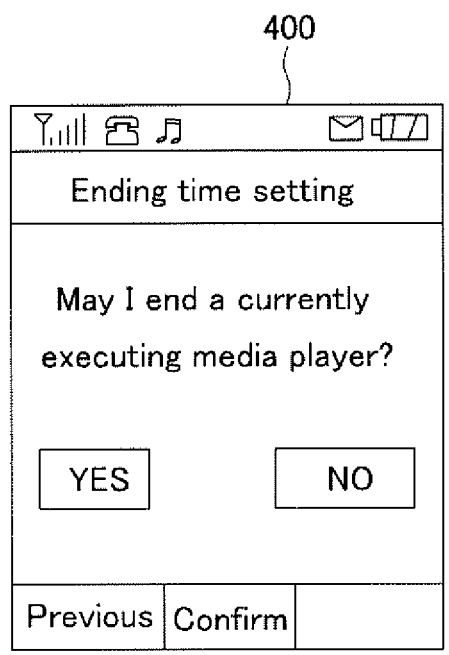
FIG. 4 is a menu screen for selecting whether to end an application in a background state.

FIG. 4 is a menu screen for selecting whether to end an application in a background state. Referring to FIG. 4, a menu screen 400 displays menus "Yes" and "No" selections so that a user may select whether to end the corresponding application (e.g., a media player) with a guide message such as, "May I end a currently executing media player?". The menu screen 400 message can be displayed in a pop-up message form.

When the user wants to end an application in a background state, the user selects "Yes" through the input unit 150 (S350: Y), the controller 130 ends the corresponding application (S360).

Alternatively, when the user does not want to end an application in a background state, the user selects, "No" through the input unit 150 (S350: N) and the controller 130 extends execution of the application whose period is expired by an ending time of the application set in the memory unit 140 (S370).

In the present invention, a period in which execution of an application whose period is expired is extended is described as an ending time of the application set in the memory unit 140, but this invention is not limited thereto. For example, an extension period can be selected by a users setting, and the extension period is not limited to an ending time of the corresponding application set in the memory unit 140.

Furthermore, as described above, when a set ending time of an application waiting for a task in a background state passes, a menu screen for selecting whether to end the application is displayed, but the present invention is not limited thereto. For example, the present invention may be embodied to directly end an application when an ending time of the application passes without displaying a menu screen for selecting whether to end the application.

As described above, in an implementation of the present invention, the number of applications operating at the same time can be reduced by automatically ending an application waiting for a task in a background state. Accordingly, battery consumption can be reduced and a processing speed of a mobile communication terminal can be improved.

In accordance with present invention, a user can directly set an ending time point of an application waiting for a task in a background state. Furthermore, the user can select whether to end an application in which an ending time point has passed.

The invention being thus described, it will be obvious that the same may be varied in many ways. Such variations are not to be regarded as a departure from the spirit and scope of the invention, and all such modifications as would be obvious to one skilled in the art are intended to be comprised within the scope of the following claims.

What is claimed is:

1. A method of setting an ending time for at least one of a plurality of applications of a mobile communication terminal, the method comprising:
   setting an ending time for the at least one of the plurality of applications;
   storing the ending time set for the at least one of the plurality of applications in a memory unit;
   executing the at least one application;
   performing multitasking in which another application of the plurality of applications is executed and the at least one of the plurality of applications enters a background state and continues to be executed in the background state;
   determining whether the ending time for one of the at least one of the plurality of applications in the background state has elapsed;
   displaying a menu screen for allowing a selection of whether to end execution of the one of the at least one of the plurality of applications in the background state upon determining that the ending time of the one of the at least one of the plurality of applications has elapsed; and
   extending the execution of the one of the at least one of the plurality of applications upon receiving input via the menu screen to not end the execution of the one of the at least one of the plurality of applications for an extension period selected by a user,
   wherein the ending time of the one of the at least one of the plurality of applications in the background state is measured from entrance of the one of the at least one of the plurality of applications into the background state.

2. The method of claim 1, wherein the ending time of the one of the at least one of the plurality of applications is adjustable.

3. A method of ending an application of a mobile communication terminal, the method comprising:
   receiving input of a predetermined end time for a specific application;
   executing the specific application;
   performing a multitasking, the multitasking including the specific application entering a background state when another application is executed and the specific application continues to be executed while in the background state;
   determining whether the predetermined end time has elapsed;

displaying a menu screen for allowing a selection of whether to end execution of the specific application in the background state upon determining that the predetermined end time has elapsed; and extending the execution of the specific application upon receiving input via the menu screen to not end the execution of the specific application for an extension period selected by a user, wherein the predetermined end time is measured from when the specific application enters the background state.

4. The method of claim 3, wherein if the extension period is not selected, the extension period is set to be same as the predetermined end time.

5. The method of claim 3, wherein the predetermined end time of the specific application is adjustable.

6. A mobile communication terminal, comprising:

an input unit configured for receiving a request for executing a first application and for receiving input of an ending time of the first application;

a memory unit for storing the ending time of the first application;

a controller for executing the first application, entering the first application into a background state when execution of a second application is requested via the input unit, executing the second application while the first application continues to be executed in the background state and determining whether the ending time of the first application has elapsed; and a display unit configured to display a menu screen for setting the ending time for the first application, wherein the ending time of the first application is measured from when the first application enters the background state, wherein the controller is further configured to control the display unit to display a menu screen for allowing a selection of whether to end execution of the first application in the background state upon determining that the ending time of the first application has elapsed, and wherein the controller is further configured to extend the execution of the first application upon receiving input via the menu screen indicating that the execution of the first application is not to be ended for an extension period selected by a user.

7. The mobile communication terminal of claim 6, wherein if the extension period is not selected, the controller is further configured to set the extension period to be same as the ending time of the first application stored in the memory unit.

8. The mobile communication terminal of claim 6, wherein the input unit is a keypad comprising a direction key, a jog dial or a touch screen.

9. A method of managing execution times for a plurality of applications in a mobile communication terminal, the method comprising:

setting an ending time for each of the plurality of applications in the mobile communication terminal;

storing the ending time set for each of the plurality of applications;

executing a specific application of the plurality of applications;

performing a multitasking in which the specific application enters a background state when another application of the plurality of applications is executed and the specific application continues to be executed in the background state;

determining whether the ending time for the specific application has elapsed;

displaying a menu screen for allowing a selection of whether to end execution of the specific application in the background state upon determining that the ending time for the specific application has elapsed;

extending the execution of the specific application upon receiving input via the menu screen to not end the execution of the specific application for an extension period selected by a user, wherein the ending time of the specific application is measured from when the specific application entered the background state.

10. The method of claim 9, wherein the ending time for each of the plurality of applications is adjustable.

11. The method of claim 9, wherein if the extension period is not selected, the extension period is set to be same as the stored ending time corresponding to the specific application.

* * * * *